United States Patent [19]

Balz et al.

[11] Patent Number: 4,625,252

[45] Date of Patent: Nov. 25, 1986

[54] GUIDE SYSTEM AND MAGNETIC TAPE CASSETTE COMPRISING SUCH A SYSTEM

[75] Inventors: Werner Balz, Limburgerhof; Wulf Muenzner, Frankenthal; Klaus Dieter Schomann, Ludwigshafen; Heinz Berger, Kehl; Roland Roos, Ludwigshafen, all of Fed. Rep. of Germany

[73] Assignee: BASF Aktiengesellschaft, Ludwigshafen, Fed. Rep. of Germany

[21] Appl. No.: 411,606

[22] Filed: Aug. 25, 1982

[30] Foreign Application Priority Data

Sep. 3, 1981 [DE] Fed. Rep. of Germany ....... 8125650
Dec. 23, 1981 [DE] Fed. Rep. of Germany ....... 8137551

[51] Int. Cl.⁴ .................... G11B 15/60; G11B 23/02
[52] U.S. Cl. ............................ 360/130.21; 360/130.3; 360/132; 242/199
[58] Field of Search ................... 360/134, 132, 130.21, 360/130.2, 130.1, 130.3, 130.31, 130.32, 130.33; 361/212, 214, 221; 242/199

[56] References Cited

U.S. PATENT DOCUMENTS

| | | | |
|---|---|---|---|
| 3,601,654 | 8/1971 | Long | 317/2 R |
| 3,841,582 | 10/1974 | Schaeffer et al. | 242/199 |
| 4,011,358 | 3/1977 | Roelofs | 360/134 |
| 4,047,232 | 9/1977 | Hisagen et al. | 360/134 |
| 4,052,750 | 10/1977 | Barber et al. | 361/212 |
| 4,163,266 | 7/1979 | Tamamura et al. | 360/84 |
| 4,276,575 | 6/1981 | Schoettle et al. | 360/130.21 |
| 4,285,020 | 8/1981 | Sato | 360/132 |
| 4,326,659 | 4/1982 | Sato | 361/212 |
| 4,337,288 | 6/1982 | Takenaka et al. | 360/134 |
| 4,342,436 | 8/1982 | Oyama et al. | 360/130.33 |
| 4,345,284 | 8/1982 | Saito | 360/132 |

FOREIGN PATENT DOCUMENTS

| | | | |
|---|---|---|---|
| 2303248 | 7/1974 | Fed. Rep. of Germany | 360/130.21 |
| 5374415 | of 0000 | Japan . | |
| 55135376 | of 0000 | Japan . | |
| 54-138411 | 11/1979 | Japan | 360/130.21 |
| 55-156708 | 10/1980 | Japan | 242/199 |
| 55-150168 | 11/1980 | Japan | 360/130.21 |
| 2027676 | 2/1980 | United Kingdom | 360/132 |

OTHER PUBLICATIONS

Patent Abstracts of Japan, Band 2, No. 109.
Patent Abstracts of Japan, Band 5, No. 5.
C. H. Schneider and H. Völz, "Magnetbänder und Grundlagen der Transportwerke", Akademie-Verlag, Berlin, 1980, vol. II, pp. 6 and 7.

Primary Examiner—A. J. Heinz
Assistant Examiner—Alfonso Garcia
Attorney, Agent, or Firm—Keil & Weinkauf

[57] ABSTRACT

A tape guide system, especially a tape guide system for a magnetic tape cassette, comprising conductive connecting means between the tape guide elements and/or the front and back of the tape, prevents the tape from blocking, slipping from the tape reels, or folding over. In practical embodiments, pieces of flexible conductive plastics film are arranged in the vicinity of the guide elements. The novel tape guide system can be used in any type of magnetic tape transport mechanism in which increased friction occurs when the tape is transported, especially in video cassettes for all systems.

8 Claims, 11 Drawing Figures

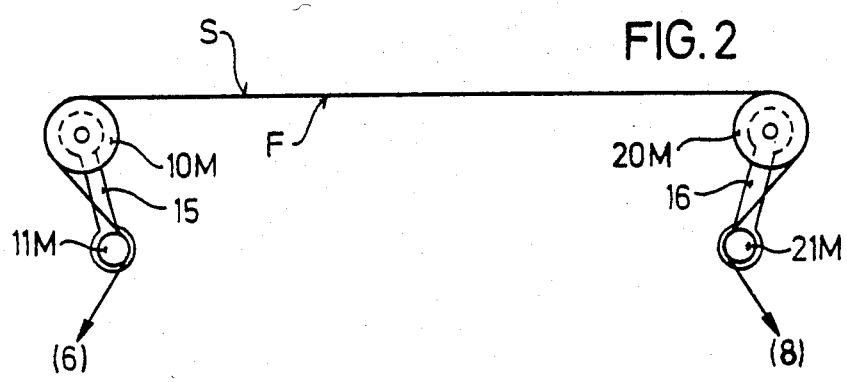
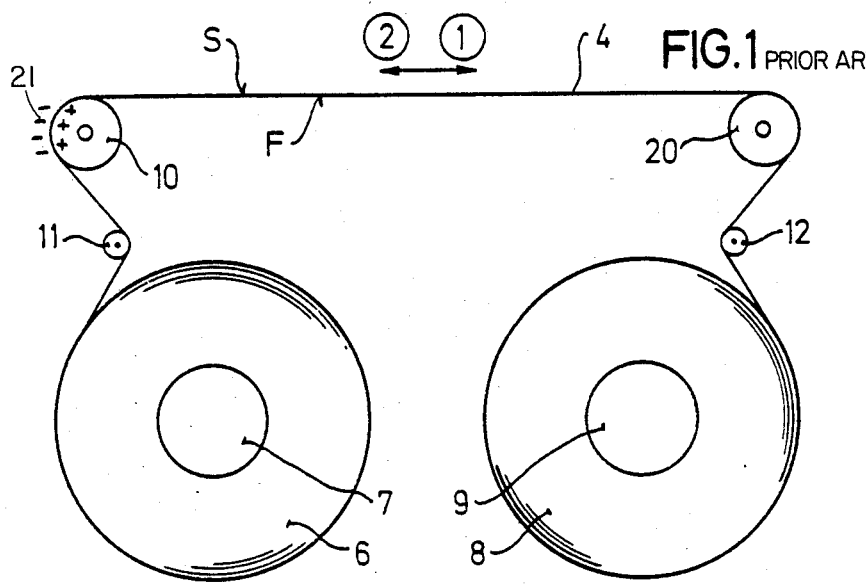
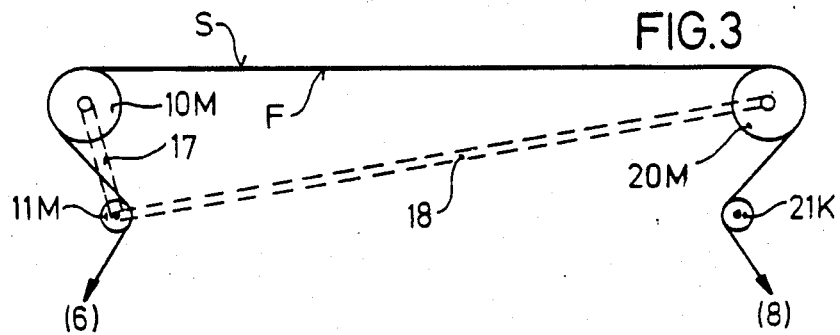

GUIDE SYSTEM AND MAGNETIC TAPE CASSETTE COMPRISING SUCH A SYSTEM

The invention relates to a tape guide system, wherein a magnetic tape having a magnetic layer face and an electrically insulating plastics film face is unwound from a tape reel and led contactingly past one or more tape guide elements having an electrically conductive surface, and in particular relates to a magnetic tape cassette containing such a tape guide system, wherein the tape is taken from a supply reel, then makes contact, on its back face, first with one or more ingress guide elements and subsequently with one or more egress guide elements, and is wound onto a take-up reel.

A variety of tape guide means are known from magnetic tape recorders for audio, video and data signals. Moreover, a great variety of tape guide means, such as rollers, pins, etc. are used in magnetic tape cassettes.

It is also known that increasing the speed of tape travel increases the electrostatic charges acquired by those members which move in frictional contact, e.g. the tape and the tape guide means, and that sticking of the tape to such means occurs, in particular under adverse climatic conditions and/or in the case of particular combinations of magnetic layer and tape film. This causes blocking of the tape, at least periodically, so that tape transport becomes irregular or even impossible.

German Laid-Open Application DOS No. 3,010,772 discloses a magnetic tape cassette for sound recording on a metal film magnetic tape, wherein there is provided, within the cassette, a discharging and earthing member which makes a conductive connection from the coated side of the magnetic tape to an earthing connector on the apparatus. The use of such a special member entails modifications of the cassette and adaptation of the apparatus, and this in turn means extra, and undesirable, expense in producing the finished cassette system. Applying the above concept to tape guide elements is neither prior art nor obvious. (Hereinafter the front face of the tape which carries the magnetic coating is referred to as "front", whilst the back face of the tape which normally consists of a plastics film is referred to as "back".)

It is common knowledge that video tapes may be provided with a coating on the back in order to increase its roughness and improve the ease of winding the tapes on flangeless hubs. This indirectly reduces the hazard of tape sticking to the guide element, since it diminishes the contact surface area.

Moreover, it has been disclosed that conductive layers, for example of carbon black or graphite, may be applied to tapes, especially to their back, so as to reduce the surface resistance of this face (cf. C. H. Schneider and H. Volz "Magnetbänder und Grundlagen der Transportwerke" Akademie-Verlag Berlin 1970, Vol. II, in particular pages 6 and 7.

The modifications of the tape, namely providing a back coating and/or providing a conductive layer, are too expensive to be used to prevent tape blocking in mass-produced video cassettes.

It is an object of the invention to prevent tape blocking, without modifying the magnetic tape per se.

In the case of a compact cassette where the tape remains at all times within the cassette it is known, cf. U.S. Pat. No. 3,601,654, that in a plastics cassette housing the tape guide rolls and guide pins, and the inner and outer faces of the tape, can be connected to one another in an electrically conductive manner by means of a spring, whilst in a metal housing or metallized plastic housing the tape inner and outer faces can be conductively connected to the housing. The connecting devices are very expensive to manufacture and assemble, occupy a great deal of space within the cassette and in most cases demand a modification of the shape of the cassette housing members.

We have found, surprisingly, that in commercial video cassettes the tapes, on re-reeling, stick—at least periodically—to the guide rolls and pins in the cassette, causing blocking and/or folding-over.

The modifications to the tape, namely providing a back coating and/or providing a conductive layer, discussed above, and the provision of expensive discharging devices, are too costly for mass-produced video cassettes. Accordingly, it is a further object of the invention to provide a simple and nevertheless effective solution to the problem of blocking.

We have found that the above objects are achieved by one or more at least partially electrically conductive connectors which connect the front and back of the tape via one or more tape guide elements so as to compensate the charge between the two faces.

The effect of this is that charges present on the tape and causing it to block on guide elements are equalized and their effects are compensated.

Since the frictional charge present is reduced, it becomes possible, surprisingly, to employ smoother surfaces on the tape and on the guide element, so that, especially in video recording, signal errors caused by protrusions on the tape and on the guide element can be avoided.

Advantageously, an arrangement with tape guide elements whose conductive surface is in contact with the back of the tape is so constructed that the connector rests simultaneously against the front of the tape and against the conductive surface of the guide element.

In this example, the connector or connectors are preferably located between the tape reel and guide element, or in the vicinity of the latter.

In this way, the proper functioning of the tape transport or of the cassette is restored by a very simple modification, which can also be carried out subsequently, at least in the vicinity of a tape guide roll. It is possible to provide an ohmic resistance of the conductive material on the connector of up to about 3 Megohm, in particular up to about 1 Megohm, which is the surface resistance of chromium dioxide video tapes. Moreover, the conductive materials can also consist of a resistor material or of metal or of a conductive varnish, or of a layer of low conductivity varnish.

Advantageously, the resistance can also be of the order of one or several 100 kiloohm, which speeds up the charge equalization. In practice, the conductive connector can consist of a resistor material, for example a layer of carbon. Another advantageous possibility is to employ a metal body or a conductive varnish or a low conductivity varnish as the conductive material for the connector.

In practice, the connector can consist of a flat, at least partially flexible, tape material, for example a piece of plastics film or the like. It can also consist of a plurality of partially cohering parts, for example a slit tape-like body of which the first parts rest against one face of the tape and the second parts against the conductive surface of the guide element, for example against the guide surface itself, against guide flanges or against the top or bottom face of the guide element. However, it is necessary to ensure that there is constant contact.

In practical embodiments, the connector can consist of a piece of plastics film, especially having a slit free end, with one end portion resting against the front of the tape and the other end portion against the conductive surface of the tape guide element.

Another means for achieving the object of the invention, in the case of a magnetic tape cassette, especially a video cassette, comprising a tape guide system according to the invention, wherein the tape is unwound from a supply reel, then makes contact, on its back, first with one or more ingress guide members and subsequently with one or more egress guide members, and is wound onto a take-up reel, is that the ingress and egress guide elements possess surfaces consisting of an electrically conductive material and that a connector is provided between the individual ingress guide elements and also between all the individual ingress guide elements.

This constitutes a single and effective modification of the cassette, whereby a serious problem in tape travel, which manifests itself especially with magnetic tapes having very different surface resistances on the front and back, can be eliminated.

In a further novel magnetic tape cassette, of the same type, it is advantageous to provide an electrically conductive connection both between the individual ingress guide elements and between one ingress guide element and the sole electrically conductive egress guide element present in this particular embodiment.

This makes it possible to employ additional guide elements consisting of insulating material, even if these are relatively remote from one another.

In a practical embodiment, the electrically conductive connection can consist of sheet metal which is easily inserted—even subsequently—into the cassette.

A further advantageous magnetic tape cassette, especially a video tape cassette, comprising a tape guide system as defined above, wherein the tape is unwound from a supply reel, then comes into contact with one or more ingress guide elements and an egress guide element on the back face, and thereafter is wound onto a take-up reel, the ingress and egress guide elements having one or more surfaces of a conductive material, is achieved, according to the invention, if there is provided, between the tape reel and the guide element, or in the vicinity of a guide element, one or more connectors which rest against the front of the tape against the conductive surface of the guide element.

In this case, the guide element is flexible and is so arranged in the cassette as to ensure constant contact, preferably surface contact, with the front of the tape and with the conductive surface of the guide element.

In a practical embodiment, the connector can be a piece of plastics film, as described above, which may be folded or slit, and is suitably fixed to the cassette housing. In order to dispense, where desired, with a second connector, a conductive connection may be used to connect the guide elements, and this connection may consist of metal sheet, of a graphite-containing or carbon-containing varnish or plastic, or of a metallized film, for example a cassette liner.

In an advantageous construction of a tape cassette, the piece of plastics film is suitably fixed, for example by clamping means, and may possess a guide shoe; advantageously, the piece of film or the guide shoe consists of a plastic containing a conductive material, especially graphite or carbon. If more than two guide elements, for example guide rolls, are provided on the back of the tape, then these require to be conductively connected by means of the connector.

In another advantageous embodiment, the conductive material may consist of a graphite-containing or carbon-containing varnish which can easily be applied inside the cassette, during its manufacture or subsequently.

In yet a further embodiment, a cassette which possesses a non-slip coating of film against which the tape reels travel may have this coating or film metallized and employed, as a conductive connection, in direct contact with the conductive parts of the guide elements.

For the purposes of the present invention "conductive" means that conduction by electrons or defect electrons takes place, and does so very rapidly. Accordingly, the "conductive connection" may consist of any metal or other material conventionally used as a conductor or material of low conductivity. Insulating materials, and materials which are only periodically conductive, are unsuitable for producing the connection required for charge equalization or for sticking effect compensation between the front and back of the tape.

In a magnetic tape system essentially comprising the supply reel, the tape guide elements for the front and back of the tape, and the take-up reel, electro static charges can be generated as follows:

Friction between the tape and the guide elements generates frictional electricity or electrostatic induction and both the tape and the guide element acquire an electrostatic charge. Additionally, such a charge may be produced on each element by distribution of such charges which are already present.

Moreover, unwinding the magnetic tape from the outermost turn of the supply reel can cause a charge separation between the unwound tape, and the outermost turn remaining on the reel, thus creating a contact potential. Normally, a separation between positive and negative charges occurs, these separated charges being transported onwards on the corresponding parts of the tape.

In neither case is it possible to differentiate between electrostatic charge generation and charge separation; the sign of the charges depends on the relatively dielectric constants of the materials.

Another factor of importance is the "charge affinity", which determines which surface of which body carries what quantity of charge at a given point in time. This "charge affinity" is determined not only by the relative dielectric constants but also by the instantaneous structure of the surfaces involved. Moreover, the elimination or removal of charges from the front and the back of the tape is different, removal from the latter being more difficult.

The above comments concerning the generation and distribution of electrostatic charges do not claim to be complete or absolutely correct; it is well known that it is extremely difficult to establish the origin and/or the quantities of charges, since electrostatic charges are ubiquitous and hence unavoidably affect the results of measurements.

Further details of the invention are disclosed in the following description of the embodiments illustrated in the accompanying drawings, in which FIG. 1 shows a prior art tape guide system, FIG. 2 shows a first tape guide system according to the present invention, FIG. 3 shows a second tape guide system according to the present invention, FIG. 4 shows a motor load diagram of a chromium dioxide magnetic tape in a system according to FIG. 1, FIG. 5 shows a motor load diagram of the same magnetic tape in a system according to FIGS. 2 and 3, FIG. 6 shows a third tape guide system according to the invention, especially a magnetic tape cassette, with two connectors attached in different ways, FIG. 7 shows a further system with a connector and a conductive connection between the guide rolls, FIG. 8 shows, in perspective, a guide roll with a piece of plastics film attached to one wall, FIG. 9 shows a guide roll and a section through a cassette housing member and a folded piece of plastics film, FIG. 10 shows a plan view of one corner of a magnetic tape cassette and FIG. 11 shows a connector in the form of a piece of plastics film with a guide shoe.

A tape guide system according to FIG. 1 essentially comprises a magnetic tape 4 having a front face S and a back face F, which tape is wound from a supply reel 6 on a spool 7 onto a take-up reel 8 on a spool 9, or vice versa. Whilst travelling from reel 6 to reel 7 the tape moves over tape guide elements 10 and 20, in general guide rolls or guide pegs; usually, contact with the magnetic head (not shown) takes place between the guide elements. The areas of contact between the tape 4 and the elements 10 and 20 depend on the wrap-round angle of the tape 4 on these guide elements.

FIG. 1 represents, for example, the tape guide system in one of the conventional video cassettes. The elements 10 and 20 are, in that case, metal pulleys located on plastics axles fixed to the cassette, and 11 is a metal pin, whilst 12 is also a metal pin or is a metal roll.

In operation of the cassette, especially on fast forward wind and rewind of the tape 4 within the cassette (speed about 0.8 m/sec) the tape is in frictional contact with the guide elements, thereby generating frictional electricity. The charge separation taking place between the elements 11 and 12 as a result of the magnetic layer S being in contact with them is slight, since the frictional potential created between the layer and 11 or 12 is immediately dissipated again because of the relatively good conductivity of the layer. The situation is different on the back of the tape. There, the charge 21 generated on the tape by guide elements, for example 10, is immobile on the insulant surface of the tape is transported away from the guide element as a result of the tape travel.

Because of the friction of the back face F against the metal pegs 10 and 20, the metal transfers a large quantity of free electrons to the surface F and thereby itself becomes more positively charged. Because the charges of opposite sign face one another, a blocking effect occurs. Since the negative charge on the front face S and the positive charge generated on the guide pegs 10 and 20 are only separated by the thin film, there is considerable electrostatic attraction between the tape and the pegs, causing the tape 4 to stick and block and making the tape guide system inefficient. Guide elements 10 and 20 will be further referred to herein as deflecting elements. The term "deflecting" relates to the fact that these elements which are located adjacent the respective front corners of the cassette housing have the function of deflecting the tape which leaves the supply reel onto a path parallel to the front of the cassette housing where the tape is scanned by the magnetic heads; and similarly have the function of deflecting the tape from this path onto the take-up reel. The wrap-around angle in each instance is considerable, typically in the order of 90° or more, as will be seen from the drawings.

Moreover, it must be assumed that because of the separation of the tape 4 from the reel 6 or 8 there is in any case an increased charge on the film F, further increasing the blocking or sticking effect.

The magnetic tape used in all the test arrangements discussed below is a commercial video tape bearing a chromium dioxide magnetic layer which has a surface resistance (measured with a square test arrangement on the coated face) of about $10^6 \Omega$. More precisely, such chromium dioxide tapes have resistivities of the order of from about $10^5$ to $5.10^7 \Omega$ depending on the nature of the chromium dioxide material, the size of the chromium dioxide particles, the degree of filling of the coating, the additives which may be employed to increase the ionic conductivity, and the binders. The film on which the tape is based usually has a surface resistance of from $10^{12}\Omega$ and $10^{14}\Omega$. A conventional measuring device comprises a two-part, two-pole surface which rests flat against the tape during measurement, and a resistance-measuring bridge. The resistance for a given square area of tape is measured, the instantaneous environmental conditions, such as surface character, humidity, soiling, etc., being taken into account automatically.

FIG. 2 shows a first magnetic tape arrangement according to the invention. All guide elements 10, 20, 11 and 21 are made, as in FIG. 1, of electrically conductive material, for example metal, and are therefore marked "M". According to the invention, the guide elements 10M and 11M, and 20M and 21M, are connected by a conductive connector, 15 and 16 respectively, for charge compensation between the faces S and F.

In the particular Example, the connectors 15 and 16 are sheet metal straps. However, the connectors can consist of any conductive material, such as graphite, molybdenum sulfide, other semi-conductors, conductive varnishes or resistor materials such as carbon, etc.

In this way, the negative charge can flow from the coating S to the guide element 11M and hence via the conductive connector 15 to the guide element 10M, i.e. charge compensation takes place, so that the charge difference between the guide element 10M and the front face S is dissipated and accordingly the forces of attraction also disappear. This moreover reduces the area of contact between the tape and the guide element, which in turn prevents, a from the outset, the generation of frictional electricity, i.e. the effect of charge compensation is also to cause the charging-up to disappear progressively. Correspondingly, in experiments, a blocking system can be caused to run perfectly satisfactorily if 10 and 11, or 11 and 21, are simultaneously touched with a wire.

However, the conductive connection can, in practice, also be brought about by a metal insert or covering in or on the connector. Advantageously, the resistance of the connector is such that the charge present is dissipated in a sufficiently short time to prevent the tape from sticking to the guide element.

In a further embodiment, shown in FIG. 3, the guide roll 21 is made of plastic, in contrast to that of FIG. 2, and is marked 21K. Here, the connector 17, which may for example consist of a graphite strip in the cassette, corresponds to the conductive plate 15 in FIG. 2. Since the roll 21K consists of a plastic, charge compensation, in the event of the tape running in direction 2, i.e. rewinding, can only occur as the tape reaches the guide elements 10M and 11M, but this leads to tape sticking, and hence to blocking, at the guide elements 20M and 21K, because there two materials with very different surface resistances (metal about $0\Omega$, plastic about $10^{12}\Omega$, coating about $10^6\Omega$, uncoated film about $10^{12}\Omega$ face one another. This is remedied by the conductive connector 18, which may be a conductive piece of sheet metal on the inside or outside, for example on one wall, of the cassette or along one web in the cassette, or can be metallized coating or foil extending over the tape reels 6 and 8 or be a conductive or semi-conductive varnish connection. Given this connection 18, the tape guide system runs entirely satisfactorily.

FIG. 4 shows the current taken by a severely blocking tape guide system, in which, whenever the tape stopped completely, tape running had to be restored by direction reversal. On average, there were fluctuations between half-load (L max/2) and full load L max. 1 is the foward direction and 2 the rewind direction.

In contrast, with an arrrangement according to FIG. 2, but using the same tape, namely a chromium dioxide tape, and the same cassette, though with connectors 15 and 16 in the form of metal straps, very uniform and troublefree tape running was achieved, requiring about one-tenth of the full load (L max/10).

Figure 6:
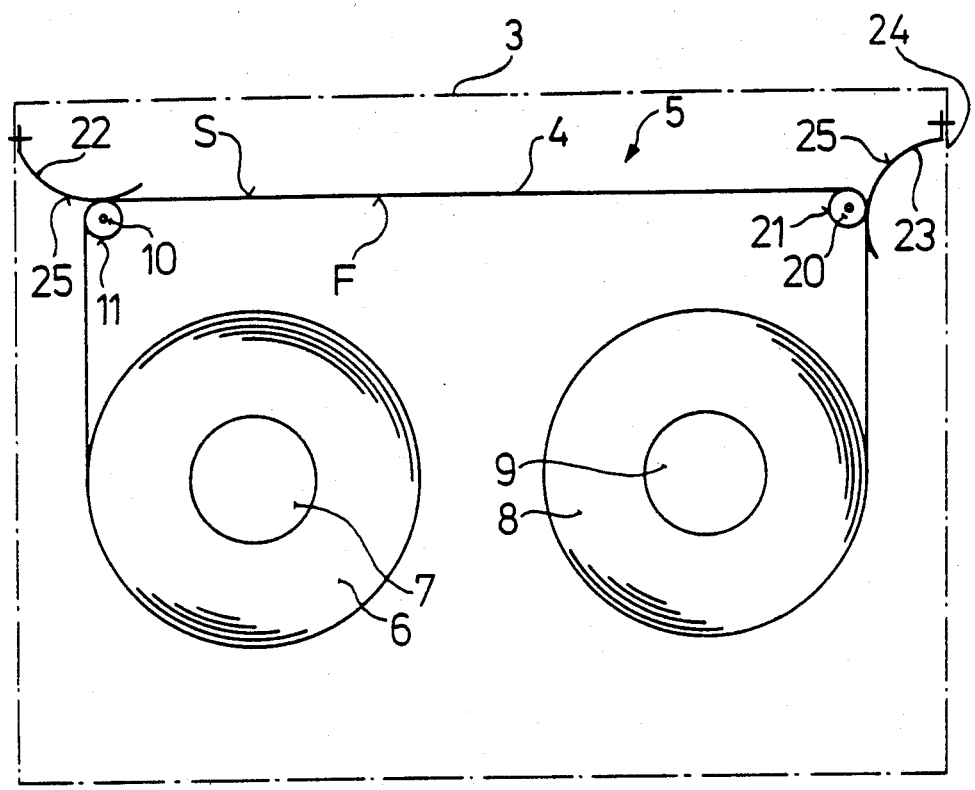

Another tape guide system 5 (FIG. 6) consists essentially of a magnetic tape 4 having a coated front S and an uncoated back F, the tape being wound from a supply reel 6 on a spool or hub 7 onto a take-up reel 8 on a spool or a hub 9, or vice versa.

Figure 8:
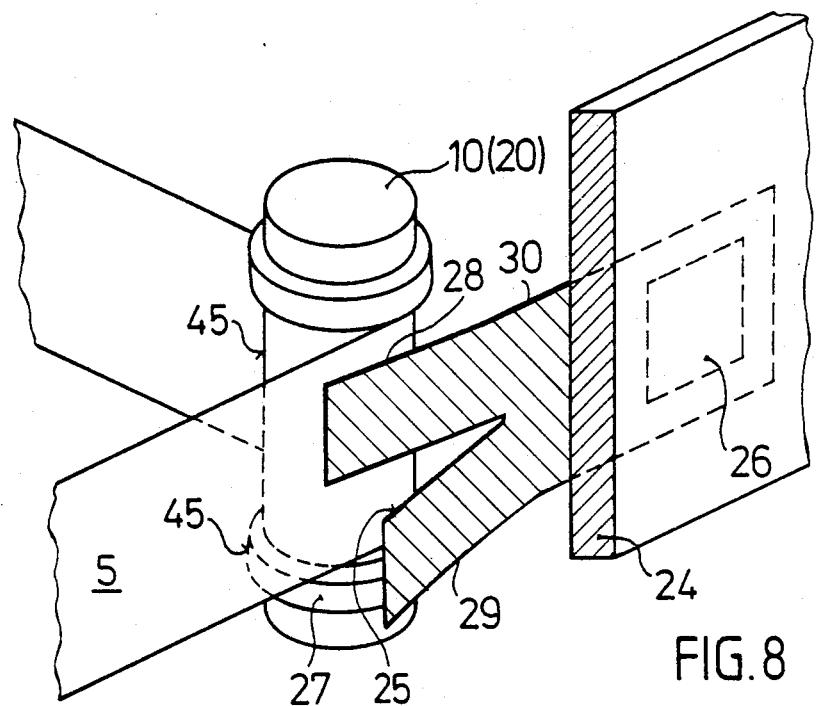
Figure 10:
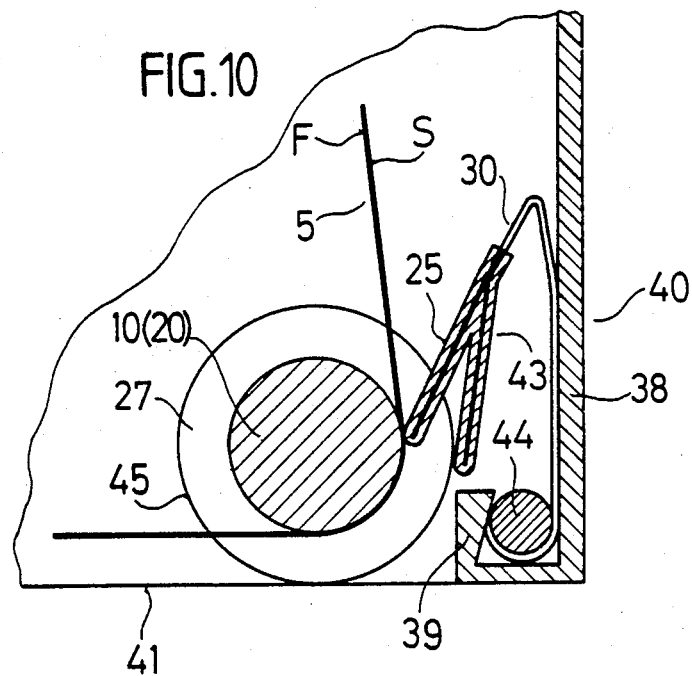
Figure 11:
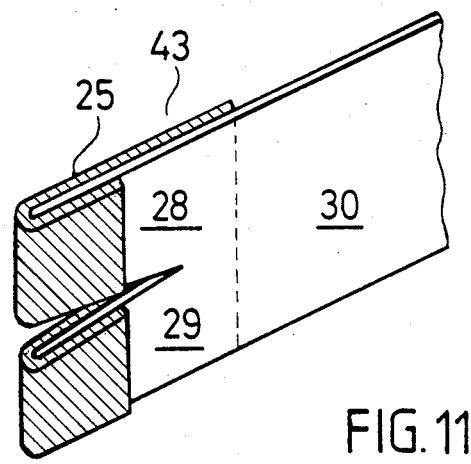

On travelling between the reels 6 and 7, the tape 4 again moves over tape guide elements 10 and 20, in general guide rolls or pegs, of which at least the surfaces are required to be electrically conductive and are hereafter referred to as the conductive surfaces 45, see FIG. 8. The tape guide system 5 can be accommodated in a cassette 3, as is shown in broken lines. In the vicinity of each of the guide rolls 10 and 20 or at least in the vicinity at one of them, a connector 22 and 23 respectively, which is electrically conductive on at least one face, and is shown as a flexible member in the drawing, is provided. For simplicity, the members 22 and 23 are of roughly identical shape, but are merely attached differently to the side wall 24 of the cassette. This attachment may be effected by, for example, a glue, a double-sided adhesive film (cf. 26 in FIG. 8) or other types of adhesive fixing but also by inserting in slits in the cassette wall 24 or clamping between extensions of the housing, or similar devices, as shown in FIG. 10. The flexible connectors 22 and 23 have at least one conductive surface 25 which, as shown, constantly rests—preferably in surface contact—against the front, i.e. coated, face S of the tape 4. FIG. 8 shows that in addition to this contact with the front of the tape there is simultaneous contact with the conductive surface of the roll 10 or 20 (at the roll flange 27 in the case shown), thereby resulting in charge compensation between the guide element and the front face S and at the same time between the guide element and the back face F, and hence also between the front and back faces. The connector 22 or 23 can for example also make contact with, i.e. rub against, the front face S between the reel 6 or 8 and the next guide element 10 or 20 respectively, and at the same time any suitable conductive connection to the guide element 10 and/or 20 can be provided additionally between the connectors 22 and 23 (cf. FIGS. 2 and 3).

Figure 9:
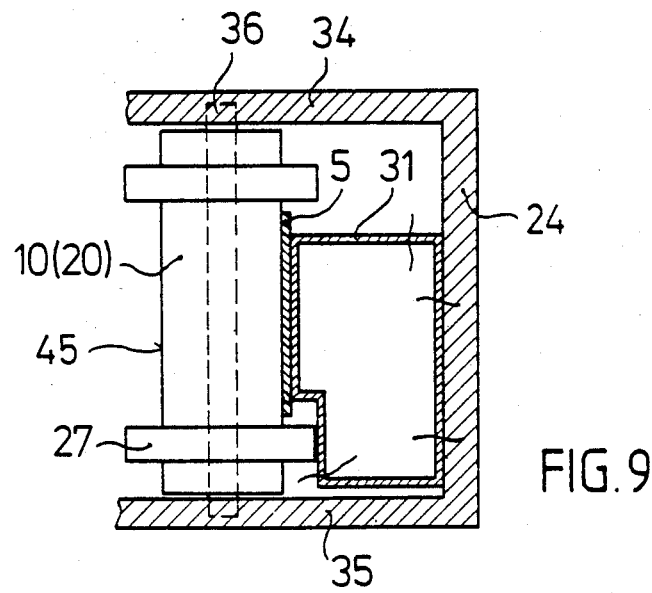

In FIG. 8, charge compensation is effected by a slit piece of plastics film, 30, having an upper and lower end portion, 28 and 29 respectively, which rest against the front face S and flange 27 respectively. FIG. 9 shows an embodiment of a bent piece of plastics film 31, of which one part, 32, rests against the front S of the tape and the other part, 33, rests against the flange 27. For simplicity, the piece of film, 31, is shown as being tubular and fixed to the wall 24. Numerous other equivalent embodiments are conceivable.

Figure 7:
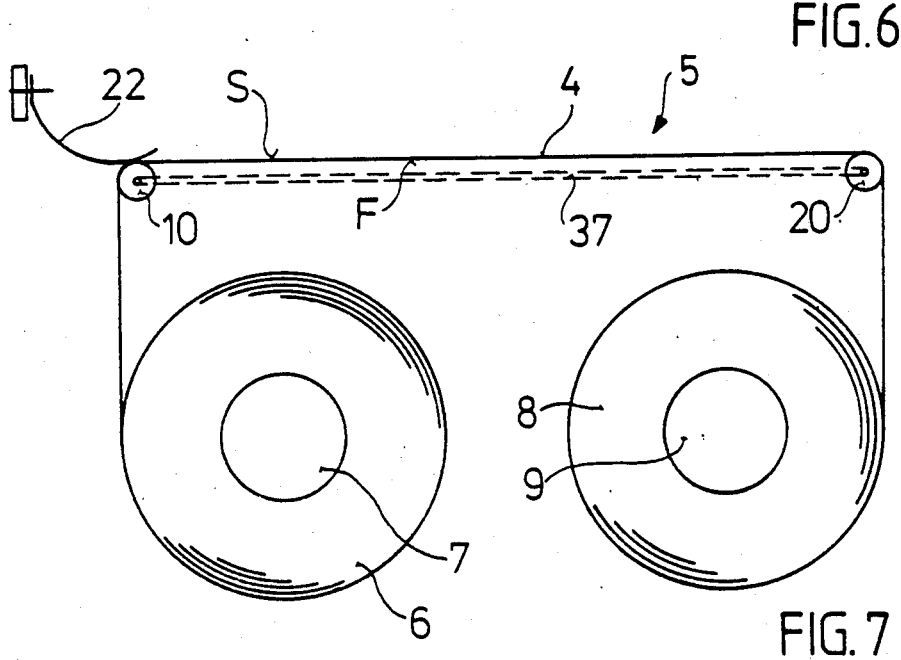

The roll 10 or 20 is, in this embodiment, rotatably carried on the axle 36 between the upper and lower walls 34 and 35 of the housing. If this axle 36 is conductively connected to the apparatus and the connection continues uninterrupted up to the second roll 20 or 10, only one connector 22 or 23, or 30 or 31, on one of the rolls, is needed since charge compensation will, with this arrangement, also take place with the other roll. If this connection via the apparatus is absent, then an extra conductive connection 37 can, as shown in FIG. 7, be provided in a suitable manner in or on the cassette, or on the apparatus.

FIG. 10 shows a corner of a magnetic tape cassette 40. The side wall 38 forms a niche 39 in the very corner, on the cassette front face 41. The Figure shows a guide roll 10 or 20 with a lower flange 27, and the tape 5 slides over the conductive surface 45 of this flange. A piece of plastics film 30, which is partially bent and provided with a guide shoe 43, serves for charge compensation on the guide element; the shoe 43 constitutes a conductive covering on the end portions 28 and 29, connects them conductively and preferably consists of a plastic, for example, polytetrafluoroethylene or polyoxymethylene, containing a conductive constituent, for example graphite, carbon black and the like. Such a plastics conductive shoe 43, containing from about 20 to 50% of graphite, has a surface resistance of about 300 ohm. The piece of film is fixed directly into the niche 39 by clamping with a pin 44, which is easy to fix and offers maximum security against dropping out.

Even though only film versions of the connectors 22, 23, 30 and 31 have been described, what is in fact essential in such connectors is that they should consist of a tape or strip which by virtue of its material and/or its shape and/or its mode of fixing is flexible, so as to ensure constant contact.

Of course, an adhesive connection can be provided instead of the pin, for example as in FIG. 8.

Where the preceding text in connection with the elements of the tape guide system refers to conductive surfaces, conductive layers, conductive faces or conductive bodies, these are required to have a conductivity of up to about 3 Megohm and preferably of up to about 1 Megohm. In each case it is advantageous if the ohmic resistance is at most of the order of the surface resistance of the coated face S of the tape. In chromium dioxide tapes, the latter is, for example, from about $10^5$ to $5.10^7$ ohm, depending on the nature of the chromium dioxide material, the particle size, the filler content of the coating, the additives used in the coating to increase the ionic conductivity, and the binder employed. The conductivity should be as large as possible under the given circumstances of the kind just mentioned, i.e. the surfce resistance should be as nearly as possible zero.

In each case, the conductivity of the tape coating itself plays an important role in whether or not a plurality of conductive guide elements have to be conductively connected together.

All types of metal foils or plastics films, with thicknesses of from about 20 to 200 μm, can be used as the material constituting the connector. Plastic films used may also contain conductive constituents such as graphite, carbon black and the like.

Any other desired combinations of different arrangements, shapes, materials, etc. can be employed provided the tape unwind/rewind or tape transport can, with such combinations, be operated at a relatively high speed, i.e. above about 50 cm/sec, without adverse electrostatic charge effects.

Figure 4:
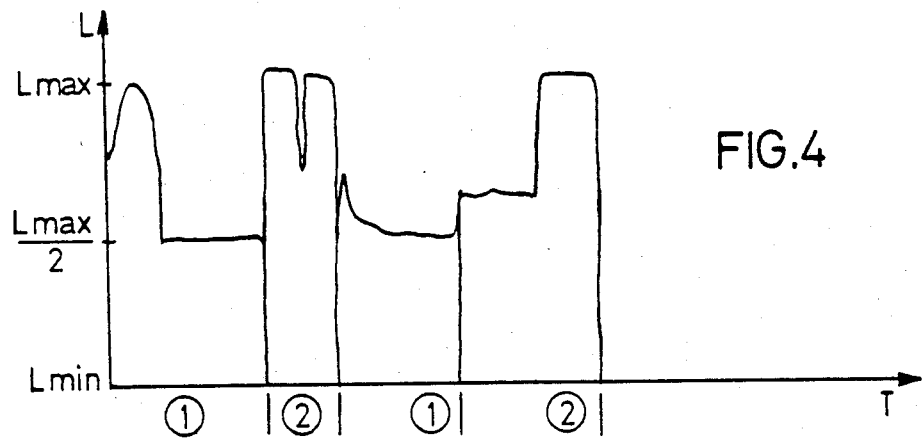
FIGS. 4 and 5 show, in terms of motor load diagrams, the conditions in an arrangement according to FIG. 1 and, in contrast, the surprising results achieved with the novel arrangements according to FIGS. 2 and 3.
Figure 5:
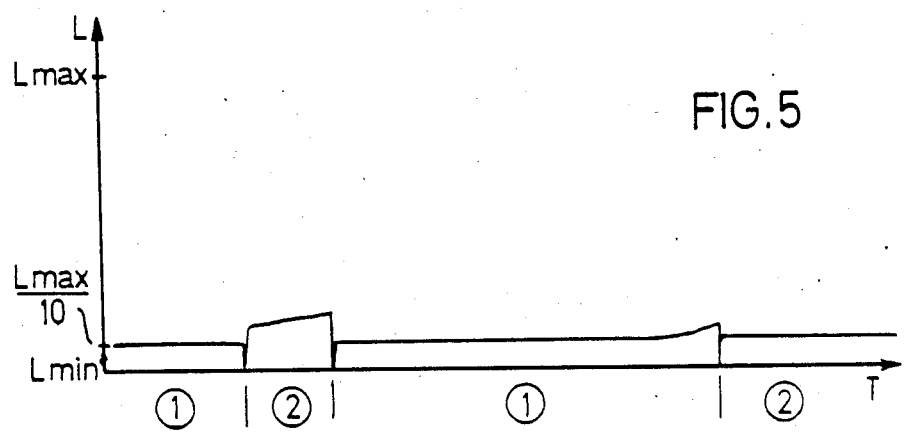

The results shown in FIGS. 4 and 5 were also attainable with the cassette constructions shown in FIGS. 6 to 11.

We claim:

1. A magnetic tape cassette, particularly video tape cassette, having a substantially rectangular housing of plastic material and, in said housing, two tape reels and guide means, including two deflecting elements adjacent the respective front corner of said housing for guiding the tape from one of said reels via one of said deflecting elements, over a path parallel to the front of said housing, and via the other deflecting element onto the other reel, said tape having a magnetic layer (front) face and an electrically insulating plastics film (back) face, and said deflecting elements contacting the back face of the tape and being at least partially of electrically conductive material, and said housing also including adjacent at least one of said deflecting elements a flexible connector element having at least one electrically conductive surface and having a split free end, one of the free end portions of said connector element contacting the front face of the tape and the other free end portion contacting the surface of said deflecting element, so as to equalize electrostatic charges between the two faces of the tape by way of said free end portions and thus counteract sticking of said tape to said deflecting elements and counteract the build-up of electrostatic charges along the tape path parallel to the front of the housing.

2. A cassette as claimed in claim 1, wherein the conductive material of the connector element has an ohmic resistance of up to about 3 megohm.

3. A cassette as claimed in claim 1, wherein the ohmic resistance of the conductive material of the connecting element is in the order of the surface resistance of the front face of the tape, particularly in the range of up to about 1 megohm.

4. A cassette as claimed in claim 1, wherein the conductive material consists of resistor material such as carbon.

5. A cassette as claimed in claim 1, wherein the connector element is of sheet metal.

6. A cassette as claimed in claim 1, wherein the connector element has a layer of conductive varnish, for example a varnish containing graphite or carbon, or a poorly conductive varnish.

7. A cassette as claimed in claim 1, wherein the connector element is a piece of metalized foil.

8. A cassette as claimed in claim 1, wherein the connector element is secured to the cassette housing by clamping.

* * * * *